Nov. 13, 1945.  R. J. MONTGOMERY  2,388,698
CABLE SLITTER
Filed March 6, 1944
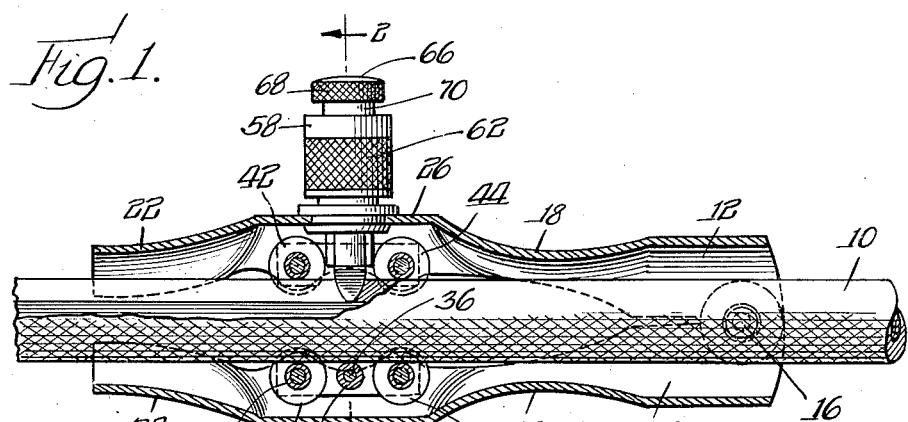
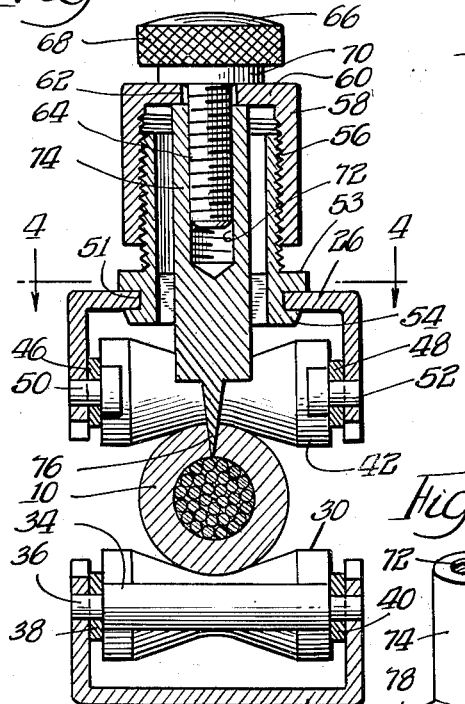
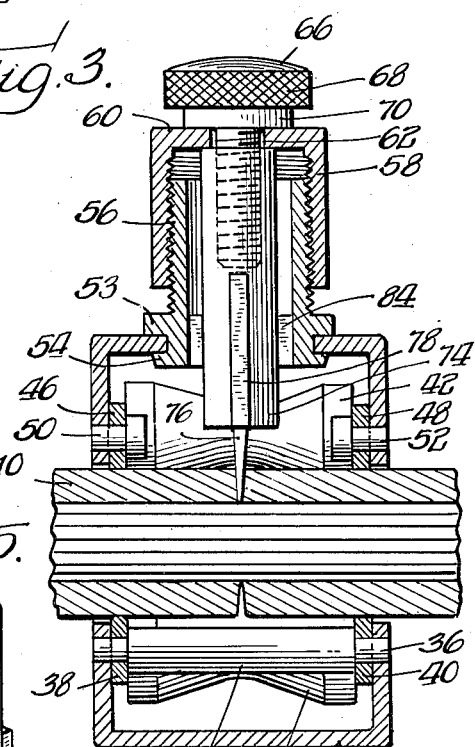
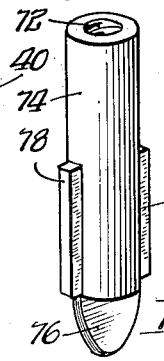
INVENTOR.
Robert J. Montgomery
By: Loftus, Moore, Olson & Trexler
attys Patented Nov. 13, 1945

2,388,698

UNITED STATES PATENT OFFICE 2,388,698

CABLE SLITTER

Robert J. Montgomery, Chicago, Ill., assignor to Henrietta G. Montgomery, Chicago, Ill.

Application March 6, 1944, Serial No. 525,254

11 Claims. (Cl. 30—91)

This invention relates to a device for cutting and slitting the insulation on heavy cables to aid in the removal of the insulation, and more particularly to adjustable means for mounting a cutting member or knife to determine the depth of cut to be made by the device on the insulation of the cable.

Cable slitting or stripping devices heretofore known have had a number of disadvantages which materially limited their use. In order to overcome some of the disadvantages such as the necessity of exerting a strong force to retain the device in slitting relation to the cable, such devices may be provided with means for reducing the friction such as rollers which press the cable into engagement with the cutting member. It furthermore is desirable to provide cable slitting or stripping devices which are readily carried about and which have a cutting means readily adjusted. In accordance with the present invention an improved cable slitting or stripping device is provided with an arrangement for adjustably securing in position a cutting device. Such an arrangement is readily adjustable without the use of special tools and furthermore has no sharply projecting members or edges so that the device readily may be carried about.

It therefore is an object of the present invention to provide in a cable slitter, an improved cutting member which is adjustable without the use of special tools.

It is still another object of the present invention to provide in a cable slitter, an arrangement for supporting a cutting member which may be adjusted to a desired position and which will remain in adjusted position.

Other and further objects subsequently will become apparent by reference to the following description taken in connection with the accompanying drawing wherein Figure 1 is a detailed section through the axis of a cable slitting device showing a portion of the cable insulation broken away to better illustrate the details of construction;

Figure 2 is a cross sectional view seen in the direction of the arrows along the line 2—2 of Figure 1 when the device used is slitting the cable insulation in a longitudinal direction;

Figure 3 is a similar cross sectional view to that shown in Figure 2 when the device is used for making the circumferential cut in the cable covering instead of a longitudinal cut;

Figure 4 is a cross sectional view in the direction of the arrows along the line 4—4 of Figure 2; and Figure 5 is a perspective view of the element which supports the cutting edge for slitting the cable insulation.

In Figure 1 there is shown a cable 10 in position with a cable slitter comprising an upper arm 12 and a lower arm 14 joined by a pivotal connection 16 adjacent one of the arms. The arms 12 and 14 are generally made similar in shape so as to have a generally circular cross section and immediately beyond the pivotal connection point the arms may be provided with curved portions 18 and 20 which serve as hand grips for the device. At the other extremity of the arms 12 and 14 other hand grip surfaces 22 and 24 may be provided, and in between the two sets of hand grip surfaces each of the arms is provided with a flat portion such as the flat portions 26 and 28. At the point where the arms 12 and 14 have the flat portions, the cross section is generally rectangular in shape as may be seen from Figures 2 and 3. Within the rectangular cross sectional area of the cable slitter there are positioned two sets of rollers for engaging the cable 10 so that the cable is centered with respect to a cutting member mounted in apparatus supported in the upper flat portion 26 of the upper arm 12.

The lower arm 14 carries a set of rollers comprising front and rear rollers 30 and 32 and an intermediate roller 34. The front and rear rollers 30 and 32 are each formed so as to have cylindrical end portions and a decreasing diameter toward the center. The intermediate roller 34 comprises a cylindrical roller rotatably mounted upon a shaft member 36 which extends to the outer edge of the rectangular side walls adjacent the flat portion 28 of the arm 14. The shaft member 36 at either end passes through longitudinally arranged plates 38 and 40 which support the end rollers 30 and 32. Thus the plates 38 and 40 pivotally support the rollers 30 and 32 about the shaft 36. By thus mounting the rollers 30 and 32 so as to tilt about the axis of the shaft 36 the accommodation of varying sizes of cables is facilitated.

The upper arm 12 is provided with two rollers 42 and 44 each having configurations generally corresponding to the configurations of the lower rollers 30 and 32. The upper rollers 42 and 44 are mounted for rotation in side plates 46 and 48 which also are arranged to tilt about a central axis. The plates 46 and 48 are mounted for tilting about the central axis by stud members 50 and 52 having internally positioned heads and boxes which extend to the outer walls of the arm 12 in the proximity of the flat portion 26.

Referring more particularly to Figures 2 and 3 it will be seen that centrally disposed upon the flat portion 26 is a circular opening 51 in which is mounted an externally threaded sleeve member 53 which may be retained in position by a rolled overportion or bead 54. The sleeve 53 has an upwardly extending externally threaded portion 56 which is surrounded by an internally threaded cylindrical member 58 having one open end, and an apertured closed end 60. A substantial portion of the outer surface of the sleeve 58 is provided with knurling so as to provide a finger gripping surface 62 so that the position of the member 58 may be adjusted relative to the sleeve member 53. The apertured end portion 60 of the cylindrical member 58 has an opening 62 through which extends the threaded portion 64 of a screw 66 having a head provided with a knurled surface 68 and an adjacent portion 70 of reduced diameter. The threaded portion 64 of the screw 66 engages an internally threaded aperture 72 in one end of a shaft member 74 having at the other end a cutting member 76 as may be seen from the perspective view in Figure 5. The shaft member 74 is provided at opposite sides with key members 78 and 80 which are arranged to operate in keyways in the sleeve member 52. The keyways for the keys 78 and 80 of the shaft member 74 are shown in the cross sectional view in Figure 4. The sleeve 52 is provided adjacent its center with an opening 82 of a diameter equal to the diameter of the body of the shaft 74. Two sets of keyways 84 and 86 are provided at right angles to each other for the keys 78 and 80 so that the cutting edge 76 attached to the shaft 74 may be arranged in either of two positions ninety degrees apart. These two sets of keyways are provided particularly for cable slitters of the type in which it is necessary to move the cutting edge 76 through ninety degrees in order to change from a longitudinal slitting position to a circumferential cutting position. As is apparent from Figures 2 and 3 the present device illustrated in the drawing is capable of producing both types of cutting operations without changing the position of the blade 76 since in one instance as shown in Figure 2 the cable 10 extends longitudinally between the two arms 12 and 14 of the device; and in Figure 3 the cable 10 extends transversely to the longitudinal length of the arms of the device.

In order to raise or lower the bottom edge of the cutting blade 76 the outer cylindrical member 58 is rotated after the screw member 66 has been loosened. Thereupon the screw member 66 is again tightened so as to bring the upper extremity of the shaft in position adjacent the inner surface of the apertured end 60 of the cylindrical member 58. The screw member 66 is tightened so that the portion 70 is firmly set against the outer surface of the apertured end 60. The threaded portion 56 on the outer surface of the sleeve 52 preferably has threads of a different pitch than the threads on the threaded portion 64 of the screw 66 so as to increase the locking action of the several cooperating parts after the desired adjustment has been made. It will also be noted that irrespective of the particular adjustment, the outer configuration of the assembly is much the same and that there are no sharp protruding edges or portions as is the case in many other arrangements where for example a threaded member extends above a locking nut a certain distance dependent upon the particular adjustment. Such other devices, therefore, are not readily carried about and frequently are the cause of scratches or other injuries to the operator of the device.

While for the purpose of illustrating and describing the present invention a particular embodiment has been shown as applied to a certain cable slitting device, it is to be understood that it is susceptible of being applied to other types of cable slitting devices, that variations may be made in the parts comprising the invention and in their arrangement without departing from the spirit and the scope of the invention as delineated in the accompanying claims.

The present invention is hereby claimed as follows:

1. A cable slitter and insulation cutter comprising a frame, cutting means carried by said frame, cable engaging means carried by said frame and associated with said cutting means and adapted to engage and press a cable into engagement with said cutting means, said cutting means being mounted on the end of a shaft, a sleeve mounted on said frame, said shaft being mounted in said sleeve, means for holding said shaft against rotary movement relative to said sleeve, a shaft positioning member threadedly mounted on said sleeve, and a lock screw arranged to threadedly engage one extremity of said shaft and to abut said shaft positioning member.

2. A cable slitter and insulation cutter comprising a frame having cable engagement means adapted to press a cable into engagement with cutting means carried by said frame, a sleeve fixedly mounted on said frame, a shaft mounted for longitudinal movement only within said sleeve, cable cutting means attached to one extremity of said shaft, a shaft positioning member threadedly mounted on the exterior of said sleeve, and a lock screw arranged to threadedly engage one extremity of said shaft and to abut said shaft positioning member.

3. A cable slitter and insulation cutter comprising a frame having cable engaging means adapted to press a cable into engagement with cutting means carried by said frame, a sleeve fixedly mounted on said frame, a shaft mounted within said sleeve, means for permitting only longitudinal movement of the shaft therein, cable cutting means attached to one extremity of said shaft, means threadedly engaging said sleeve for determining the position of said shaft relative to said sleeve, and a locking screw arranged to extend through said shaft positioning means to threadedly engage one extremity of said shaft and to abut said shaft position determining means.

4. A cable slitter and insulation cutter comprising a pair of hingedly connected arms, one of said arms carrying cutting means and the other carrying cable engaging means for pressing a cable into engagement with said cutting means, said cutting means being attached to one end of a shaft, a sleeve mounted on one of said arms, said sleeve having portions arranged to engage cooperating portions of said shaft to permit only reciprocable movement thereof, a shaft positioning member threadedly engaging the exterior of said sleeve, said positioning member having an apertured end adapted to be engaged by one end of said shaft, having a screw member arranged to engage said shaft and having a head adapted to engage the exterior of said apertured end of said positioning member.

5. In a cable slitter and insulation cutter comprising a pair of hingedly connecting arms, one of said arms carrying cutting means and the other carrying cable engaging means for pressing a cable into engagement with said cutting means, the combination comprising cutting means supported at one end of a shaft, a sleeve mounted on one of said arms, said sleeve being arranged to engage longitudinally extending portions of said shaft to permit only longitudinal movement thereof, a shaft positioning member threadedly engaging the exterior of said sleeve, said positioning member having a finger gripping surface, said positioning member having an apertured end, and a screw member adapted to engage the other end of said shaft and having a finger gripping head adapted to engage the exterior of said positioning member and to bring the end of said shaft into engagement with the interior of said positioning member.

6. A cable slitter and insulation cutter having an arm provided with a sleeve mounted thereon, said sleeve having a threaded exterior and having an interior arranged to receive a shaft in either of two positions at angular displacement of ninety degrees, a shaft mounted in said sleeve and having an exterior cooperating with the interior of said sleeve to permit only longitudinal movement relative thereto, cutting means attached to one end of said shaft, manually operable positioning means threadedly mounted about the exterior of said sleeve, and shaft locking means comprising a screw having a threaded portion engaging said shaft and having a head adapted to engage said positioning member.

7. A cable slitter and insulation cutter comprising a frame having cable engaging means adapted to press a cable into engagement with cutting means carried by said frame, a sleeve fixedly mounted on said frame, said sleeve having a threaded exterior, a shaft mounted within said sleeve, said shaft and said sleeve being provided with cooperating means to permit only longitudinal movement of the shaft relative to said sleeve, said shaft having cutting means attached to one extremity and having a threaded aperture provided at the other extremity, a threaded cylindrical member having an open end and an apertured end adapted to engage one end of said shaft, said threaded cylindrical member being threadedly mounted upon the threaded exterior of said sleeve, and a screw member having a head adapted to engage the exterior of said apertured end of said cylindrical member and having a threaded portion in engagement with the threaded aperture of said cylindrical member, said cylindrical member and said screw member having different rates of longitudinal travel for equal angular displacements.

8. In a cable slitter and insulation cutter having a frame formed in two portions hinged together, one portion carrying cable engaging means adapted to press a cable into engagement with cuting means carried by said frame, the combination comprising a sleeve fixedly mounted on the other portion of said frame, said sleeve having a threaded exterior, a rod mounted within said sleeve for longitudinal movement relative thereto, said sleeve and said rod having cooperating portions to prohibit relative rotational movement, cable cutting means attached to one extremity of said rod, said rod being provided at its other extremity with a threaded aperture, a rod positioning member comprising an internally threaded cylindrical body having an open end and an apertured end adapted to be engaged by one end of said rod said positioning member being mounted on said sleeve, and a screw member having a head adapted to engage the exterior of said apertured end of said cylindrical member and a threaded portion in engagement with the threaded aperture at one extremity of said rod, said screw member and said sleeve being provided with threads having different pitch.

9. In a cable slitter and insulation cutter, the combination comprising a frame member, a sleeve mounted on said frame member, a rod having at the end thereof cutting means, said rod being mounted in said sleeve in a keyed manner to hold said rod against rotary movement relative to said sleeve, a rod positioning member threadedly mounted on said sleeve, and a lock screw arranged to threadedly engage one extremity of said rod and to abut said rod positioning member.

10. In a cable slitter and insulation cutter, the combination comprising a frame member, a sleeve fixedly mounted on said frame member, a rod mounted for longitudinal movement only within said sleeve, cable cutting means attached to one extremity of said rod, threaded means at the other end of said rod, a rod positioning member threadedly mounted on the exterior of said sleeve, and a lock screw arranged to threadedly engage one extremity of said rod and to abut said rod positioning member.

11. In a cable slitter and insulation cutter, the combination comprising a frame member, a sleeve fixedly mounted on said frame member, a rod mounted for longitudinal movement only within said sleeve, cable cutting means attached to one extremity of said rod, threaded means at the other end of said rod, a rod positioning member threadedly mounted on the exterior of said sleeve, and a lock screw arranged to threadedly engage one extremity of said rod and to abut said rod positioning member, said lock screw and said rod positioning member being provided with threads having different pitch.

ROBERT J. MONTGOMERY.